(12) United States Patent
Tseitlin et al.

(10) Patent No.: US 9,577,950 B2
(45) Date of Patent: *Feb. 21, 2017

(54) METHOD AND SYSTEM FOR RECLAIMING UNUSED RESOURCES IN A NETWORKED APPLICATION ENVIRONMENT

(71) Applicant: NETFLIX, INC., Los Gatos, CA (US)

(72) Inventors: Ariel Tseitlin, Sunnyvale, CA (US); Praveen Sadhu, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,859

(22) Filed: May 4, 2015

(65) Prior Publication Data

US 2015/0236976 A1 Aug. 20, 2015

Related U.S. Application Data

(63) Continuation of application No. 13/445,877, filed on Apr. 12, 2012, now Pat. No. 9,026,586.

(51) Int. Cl.
| | |
|---|---|
| *G06F 15/16* | (2006.01) |
| *H04L 12/917* | (2013.01) |
| *G06F 17/30* | (2006.01) |
| *H04L 29/08* | (2006.01) |

(52) U.S. Cl.
CPC ............ *H04L 47/76* (2013.01); *G06F 17/301* (2013.01); *G06F 17/30598* (2013.01); *H04L 29/08072* (2013.01)

(58) Field of Classification Search
CPC .......................... H04L 29/08072; H04L 29/06
USPC ................................. 709/206, 220, 224, 228
See application file for complete search history.

(56) References Cited

U.S. PATENT DOCUMENTS

| | | | | |
|---|---|---|---|---|
| 6,954,729 | B2 * | 10/2005 | Lee ........................... | B07C 3/00 705/1.1 |
| 7,302,634 | B2 * | 11/2007 | Lucovsky ............. | G06F 21/335 707/999.01 |
| 7,664,724 | B2 * | 2/2010 | Lucovsky ............. | G06F 21/335 707/781 |
| 9,026,586 | B2 * | 5/2015 | Tseitlin .................. | G06F 9/5022 709/203 |

(Continued)

*Primary Examiner* — Khanh Dinh
(74) *Attorney, Agent, or Firm* — Artegis Law Group, LLP

(57) ABSTRACT

Techniques are disclosed for reclaiming resources within a distributed computing system. A reclamation application searches the distributed computing architecture for unused resources, classifies the unused resources, and determines an expiration period based on the classification. The reclamation application determines a candidate owner of the resource based on one or more characteristics of the resource. The reclamation application then notifies the candidate owner that the resource is to be reclaimed unless claimed by the candidate owner within the expiration period. If the candidate owner claims the resource within the expiration period, then the reclamation application terminates the reclamation of the resource. If the candidate owner does not claim the resource within the expiration period, then the reclamation application reclaims the resource after the duration of the expiration period. Advantageously, reclaiming resources results in more efficient utilization of resources, lower operation and maintenance costs, and improved system security.

20 Claims, 3 Drawing Sheets

(56) References Cited

U.S. PATENT DOCUMENTS

| | | | |
|---|---|---|---|
| 2003/0131073 A1* | 7/2003 | Lucovsky | G06F 21/335 |
| | | | 709/219 |
| 2006/0161554 A1* | 7/2006 | Lucovsky | G06F 21/335 |
| 2011/0046994 A1* | 2/2011 | Nielsen | G06Q 10/06 |
| | | | 340/540 |
| 2014/0075004 A1* | 3/2014 | Van Dusen | H04L 41/04 |
| | | | 709/223 |

* cited by examiner

METHOD AND SYSTEM FOR RECLAIMING UNUSED RESOURCES IN A NETWORKED APPLICATION ENVIRONMENT

CROSS-REFERENCE TO RELATED APPLICATIONS

This application is a continuation of the co-pending U.S. patent application titled, "METHOD AND SYSTEM FOR RECLAIMING UNUSED RESOURCES IN A NETWORKED APPLICATION ENVIRONMENT," filed on Apr. 12, 2012 and having Ser. No. 13/445,877. The subject matter of this related application is hereby incorporated herein by reference.

BACKGROUND OF THE INVENTION

Field of the Invention

Embodiments of the present invention generally relate to distributed computing systems and methods, and more specifically to reclaiming unused resources in a networked application environment.

Description of Related Art

A broad variety of computing applications have been made available to users over computer networks. Frequently, a networked application may be provided using multiple interacting computing nodes within a distributed computing architecture. For example, a web site may be provided using a web server (running on one node within the distributed computing system) configured to receive requests from users for web pages. The requests can be passed to an application server (running on another node within the distributed computing system), which in turn processes the requests and generate responses passed back to the web server, and ultimately to the users.

Another example of a networked application includes a content distribution system used to provide access to media titles over a network. Typically, a content distribution system may include various servers such as access servers and content servers. Clients may connect to the servers using a content player, such as a gaming console, computing system, computing tablet, mobile telephone, or network-aware DVD player. The content server stores files (or "streams") available for download from the content server to the content player. Each stream may provide a digital version of various forms of video or other content, such as a movie, a television program, a sporting event, user generated content, or a staged or live event captured by recorded video. Users access the service by connecting to a web server, where a list of content is available. Once a request for a particular title is received, the title may be streamed to the client system over a connection to an available content server.

One problem with distributed computing systems is that networked applications running on systems such as these often accumulate multiple resources, such as storage volumes and licenses for software applications, some of which may have fallen into disuse. Unused resources could be redeployed to other networked applications where the resources would be utilized more efficiently. In addition, users may pay for reserving or maintaining resources within the distributed computing architecture. Where resources have fallen into disuse, users may be paying for resources that are underutilized. Further, security vulnerabilities may arise when resources fall into disuse. Unused resources may not receive software updates, including updates to resolve security problems, and thus present a security risk to the distributed computing system. While unused resources may be reclaimed manually, some unused resources may be inadvertently missed due to human error, while other unused resources may be difficult to discover using manual processes.

As the foregoing illustrates, what is needed is a more automated way to discover and reclaim resources that have fallen into disuse.

SUMMARY OF THE INVENTION

One embodiment of the present invention sets forth a computer-implemented method for reclaiming unused resources in a networked application environment. The method includes identifying a resource that is eligible for reclaiming, determining a classification for the resource based on one or more classification criteria, notifying a candidate owner of the resource that the resource is to be reclaimed at the termination of an expiration period, and if the candidate owner claims the resource within the expiration period, then terminating the reclamation of the resource, or if the candidate owner does not claim the resource within the expiration period, then reclaiming the resource.

Other embodiments include, without limitation, a computer-readable medium that includes instructions that enable a processing unit to implement one or more aspects of the disclosed methods as well as a system configured to implement one or more aspects of the disclosed methods.

One advantage of the disclosed method is that unused resources in a distributed computing architecture are reclaimed and subsequently may be relinquished or redeployed, resulting in more efficient and cost effective utilization of the resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention. Further, particular embodiments of the invention are described using an example of a networked application used to stream movies, music, television programming, user generated content etc., over a data communications network to end-user client devices. However, it should be understood that embodiments of the invention may be adapted to discover and reclaim unused resources for a broad variety of networked applications or services. Accordingly, references to a streaming media service are merely illustrative and not limiting.

Figure 1:
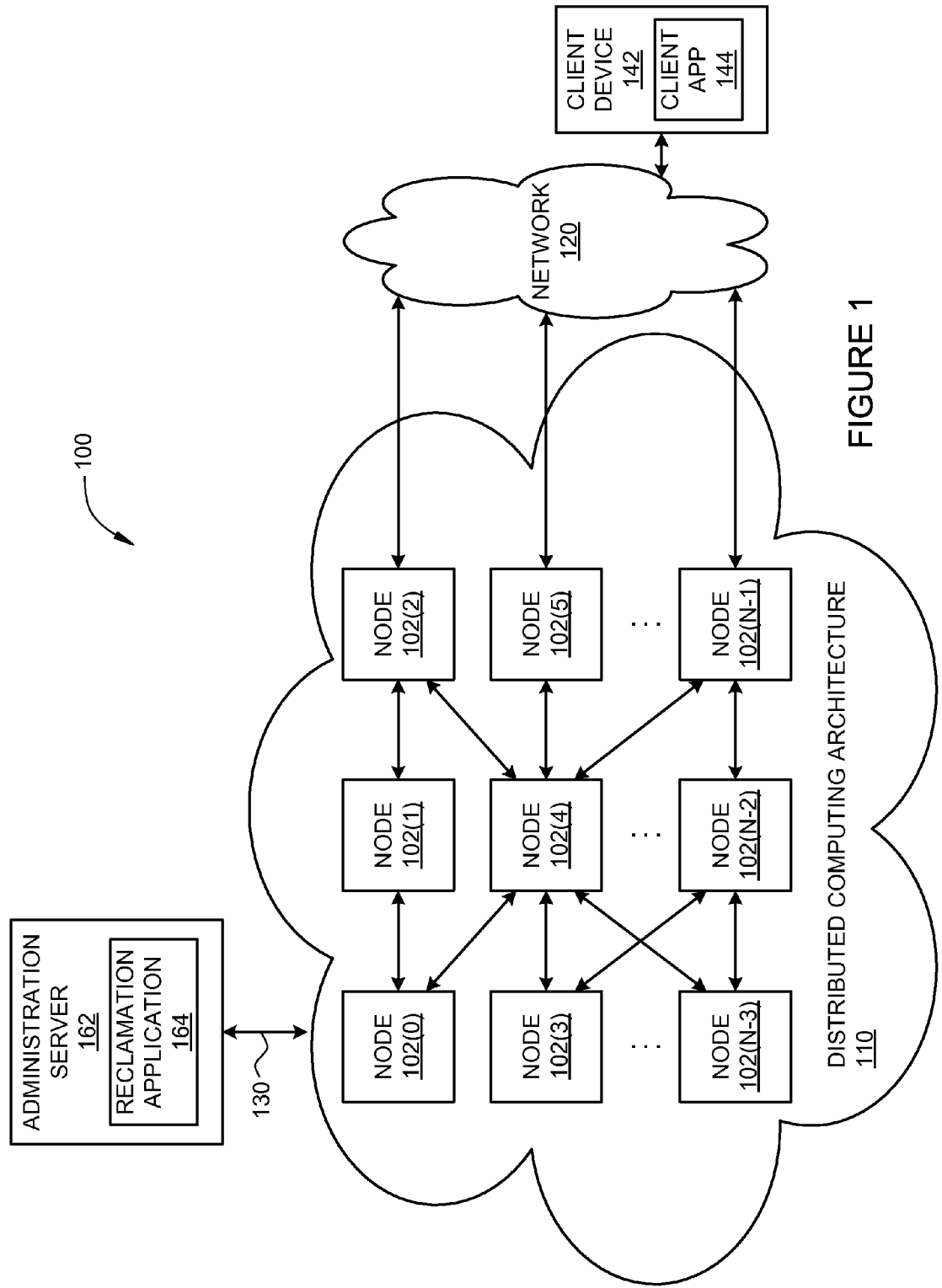
FIG. 1 illustrates a distributed computing system configured to implement one or more aspects of the present invention.

FIG. 1 illustrates a distributed computing system 100 configured to implement one or more aspects of the present invention. As shown, the distributed computing system 100 includes, without limitation, a distributed computing architecture 110 (also referred to herein as "the cloud"), a network 120, a client device 142, a communication channel 130, and an administration server.

The distributed computing architecture 110 includes a plurality of "compute nodes" 102 (referred to herein as nodes). Each of the nodes 102 may include a processor (CPU), a memory, a network interface controller (NIC), and one or more non-volatile storage devices such as a hard-disk drive, a magnetic tape drive, optical disk drives, a drive array (e.g., RAID), or the like. Each node 102 includes an operating system as well as one or more applications stored in memory and executing on the CPU. Some of the applications may provide a software framework for various cloud service architectures, such as a distributed database management system or a distributed application system. Such applications may execute on a single node 102. Applications may also execute on multiple nodes 102 where portions of the application run on different nodes 102. Alternatively, multiple instances of the application, where the instances execute on various nodes 102 within distributed computing system 100. The distributed computing architecture 110 provides one or more virtual computing services via standard messaging protocols, such as representational state transfer (REST). Examples of virtual computing services may include processing capacity, storage, and relational databases, among many other types of services. The virtual computing services may include networked applications where various active application components of the networked application execute on a plurality of nodes in communication with each other. For example, node 102(0) may execute one active application component of a networked application. Node 102(0) may communicate with node 102(4), where node 102(4) may execute a second active application component of the same networked application. Node 102(4) may communicate with nodes 102(2), 102(5), 102(N−1), where each of these nodes may execute an instance of a third active application component of the same networked application. The nodes 102 interconnect to each other through any technically feasible means. As described below, the distributed computing architecture connect to external devices and other computing systems via network 120 and communication channel 130.

The network 120 connects the distributed computing architecture 110 to external devices such as client device 142. The network 120 may include any technically feasible networking system such as a LAN (Local Area Network), a WAN (Wide Area Network), or the Internet.

The client device 142 is configured to access one or more applications executing within the distributed computing architecture 110. For example, the client device may access a content distribution system executing within the distributed computing architecture 110 to access media titles over network 120. In one embodiment, client computer 142 is maintained by a data analyst to analyze the distributed computing architecture 110. The client device 142 includes a processor (CPU), a memory, a NIC, and one or more non-volatile storage devices (not shown). Similar to nodes 102, client device 142 also includes an operating system as well as one or more applications, such as client application 144, stored in memory and running on the CPU. The client device 142 communicates with one or more of the nodes 102 via network 120 thereby allowing the client application 144 to access to or more networked applications executing on the distributed computing architecture 110.

The communication channel 130 connects one or more nodes 102 within the distributed computing architecture 110 to a computing system utilized for configuring, maintaining, and testing the distributed computing architecture 110 such as the administration server 162. The network 120 may include any technically feasible communication channel including a point-to-point connection, or a networking system such as a LAN (Local Area Network), a WAN (Wide Area Network), or the Internet.

The administration server 162 performs administrative tasks for the distributed computing architecture 110 autonomously or in response to one or more commands issued by a system administrator. The administration server 162 may be any type of computing device such as a personal computer, minicomputer or server. As shown, the administration server 162 may include one or more software applications that allow a system administrator to perform various functions including, without limitation, configuring, monitoring, and testing the distributed computing architecture 110.

In one embodiment, the administration server 162 includes a reclamation application 164 that enables searches for unused resources within the distributed computing architecture 110. As described in greater detail herein, the reclamation application determines the expiration period for the resource, identifies a candidate owner of the resource, and notifies the candidate owner. If the candidate owner does not claim the resource within the expiration period, then the reclamation application 164 is able to reclaim the resource. The administration server 162 communicates to one or more of the nodes 102 via communication link 130.

Figure 2:
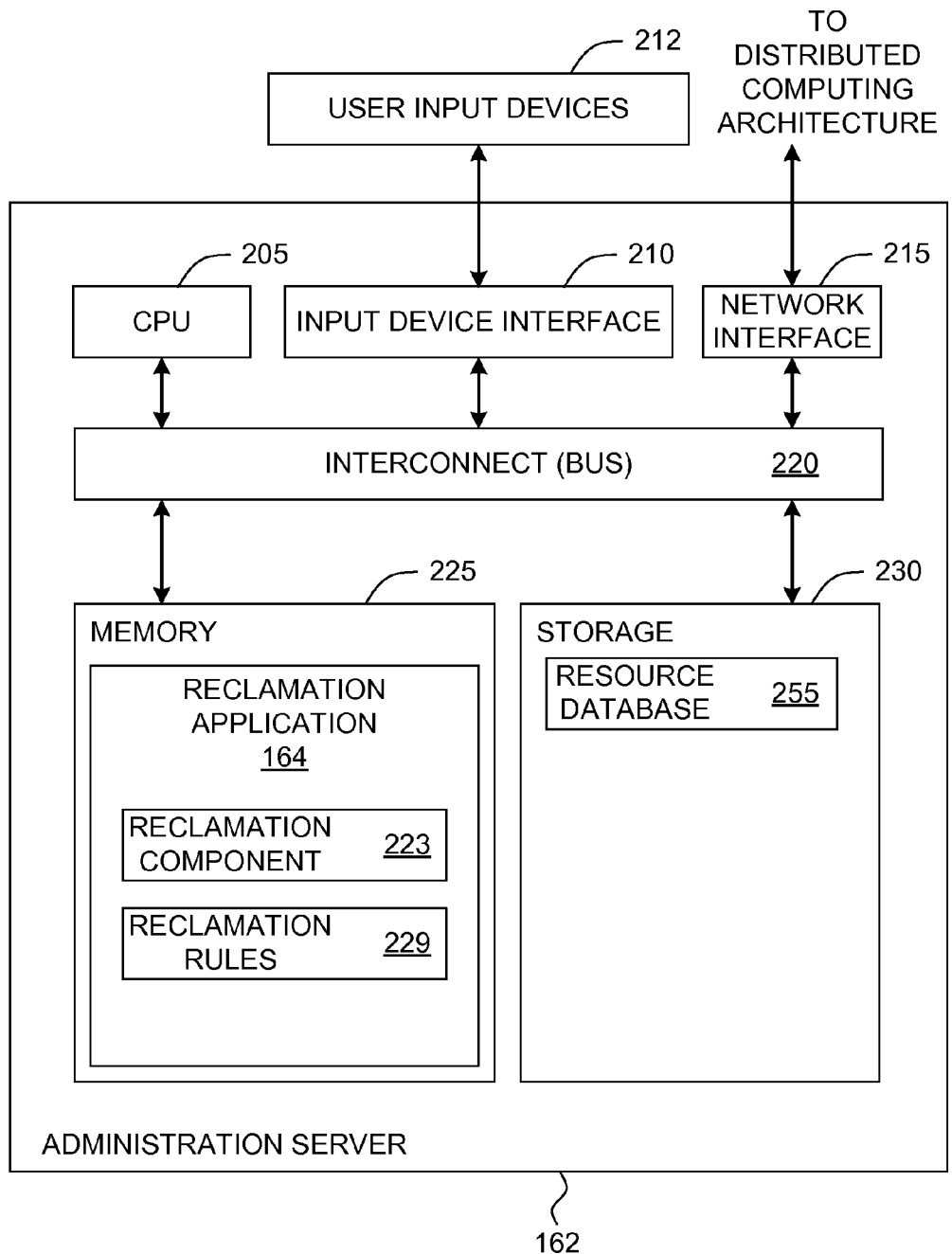
FIG. 2 illustrates the administration server of FIG. 1 which includes the reclamation application, according to one embodiment of the invention.

FIG. 2 illustrates the administration server 162 of FIG. 1 which includes the reclamation application 164, according to one embodiment of the invention. As shown, the administration server 162 includes, without limitation, a central processing unit (CPU) 205, an interconnect 220, a network interface 215, a memory 225, and storage 230. The administration server 162 may also include an I/O device interface 210 connecting I/O devices 212 (e.g., keyboard, display and mouse devices) to the administration server 162.

The CPU 205 is included to be representative of a single CPU, multiple CPUs, a single CPU having multiple processing cores, and the like. The CPU retrieves and executes programming instructions related to various application programs residing on the administration server 162. The CPU 205 is connected to other components within the administration server 162 via the interconnect 220. The interconnect 220 is a communications channel, such as a computer bus, to provide a means of communication among the various components within the administration server 162. The interconnect 220 facilitates transmission of programming instructions and application data between the CPU 205, network interface 215, memory 225, storage 230, and I/O devices interface 210. The network interface 215 provides a communication path between the administration server 162 and the distributed computing infrastructure 110. The memory 225 includes programming and instructions and application data for the administration server 162. Accordingly, the CPU 205 retrieves and executes programming instructions stored in the memory 225. Similarly, the CPU 205 stores and retrieves application data residing in the memory 225. The memory 225 is generally included to be representative of a random access memory. The storage 230 may be any device for long term storage of data such as a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN). The I/O device interface 210 connects I/O devices 212 (e.g., keyboard, display and mouse devices) to the administration server 162.

As shown, the memory 225 includes a reclamation application 164 and storage 230 includes a resource database 255. The reclamation application 164 includes a reclamation component 223 and reclamation rules 229. As noted above, the reclamation application 164 is configured to search the distributed computing architecture 110 for unused resources and then, if desired, reclaim the resources.

The reclamation component 223 is configured to search the distributed computing architecture 110 via network interface 215 to identify resources that are eligible for reclaiming. Resources are determined to be eligible for reclaiming based on one or more conditions including, without limitation, resources associated with out of date software, resources that have not been accessed for a pre-determined period of time, and resources associated with a storage volume that contains no data. When an unused resource has been identified, the reclamation component 223 determines a class for the resource based on one or more classification criteria. For example, the reclamation component 223 may determine that an unused resource is classified as an instance of a software application, a user account, or a storage volume. In another example, multiple instances of a software application may exist within the distributed computing architecture, and the reclamation component 223 classifies the instances based on the software version number of the software application associated with each instance. The classification criteria may also include characteristics not directly related to the type of resource, such as the date on which the resource was last accessed or the version number of a software application associated with the resource.

The reclamation component 223 determines an expiration period for the resource based on one or more reclamation rules 229. For example, the reclamation rules 229 may indicate that a storage volume has an expiration period of fifteen days, while an instance of a software application has an expiration period of thirty days. The reclamation rules 229 include any suitable rules for setting expiration periods associated with a reclaimable resource, as tailored for the distributed computing architecture 110.

The reclamation component 223 also is responsible for identifying a candidate owner of a reclaimable resource based on one or more characteristics of the resource. Examples of resource characteristics include, without limitation, a username to which the resource is registered, a username associated with one or more data files stored within the resource, and in cases where more than one candidate owner is identified, the reclamation application may use any technically feasible technique for determining the most likely candidate owner. The reclamation component 223 then notifies the candidate owner that the resource will be reclaimed at the termination of the expiration period. For example, the reclamation component 223 may send an email to the candidate owner via network interface 215. The notification includes information identifying the resource and the expiration period for the resource based on the reclamation rules 229.

In certain circumstances, the reclamation component 223 may be unable to determine candidate owner for an unused resource. For example, a resource may have no identifiable characteristics to identify a candidate owner. In another example, the reclamation component 223 may have determined a candidate owner and sent the candidate owner a notification, but the candidate owner is not the actual owner. In another example, the reclamation component 223 may have determined a candidate owner who no longer owns the resource. In such cases, the reclamation component 223 notifies the system administrator that no candidate owner has been identified, and terminates the reclamation of the resource. The system administrator may then manually attempt to reclaim the resource.

Once the reclamation component 223 has notified the candidate owner, the candidate owner may respond and claim the resource within the duration of the expiration period, otherwise the resource is reclaimed. The candidate owner may reclaim the resource through any technically feasible means, such as replying to the notification, by accessing a specific uniform resource locator (URL) associated with a website that is configured to claim resources, or by requesting an extension to the expiration period. If the candidate owner claims the resource, then the reclamation component 223 terminates the process for reclaiming the resource. Alternatively, the candidate owner may respond and request that the expiration period be extended. If the expiration period is extended, then the resource is still eligible for reclaiming, but the reclamation component 223 delays reclaiming the resource until the expiration of the extended period. If the candidate owner does not respond to the notification within the expiration period, then the reclamation component 223 proceeds to reclaim the resource.

Figure 3:
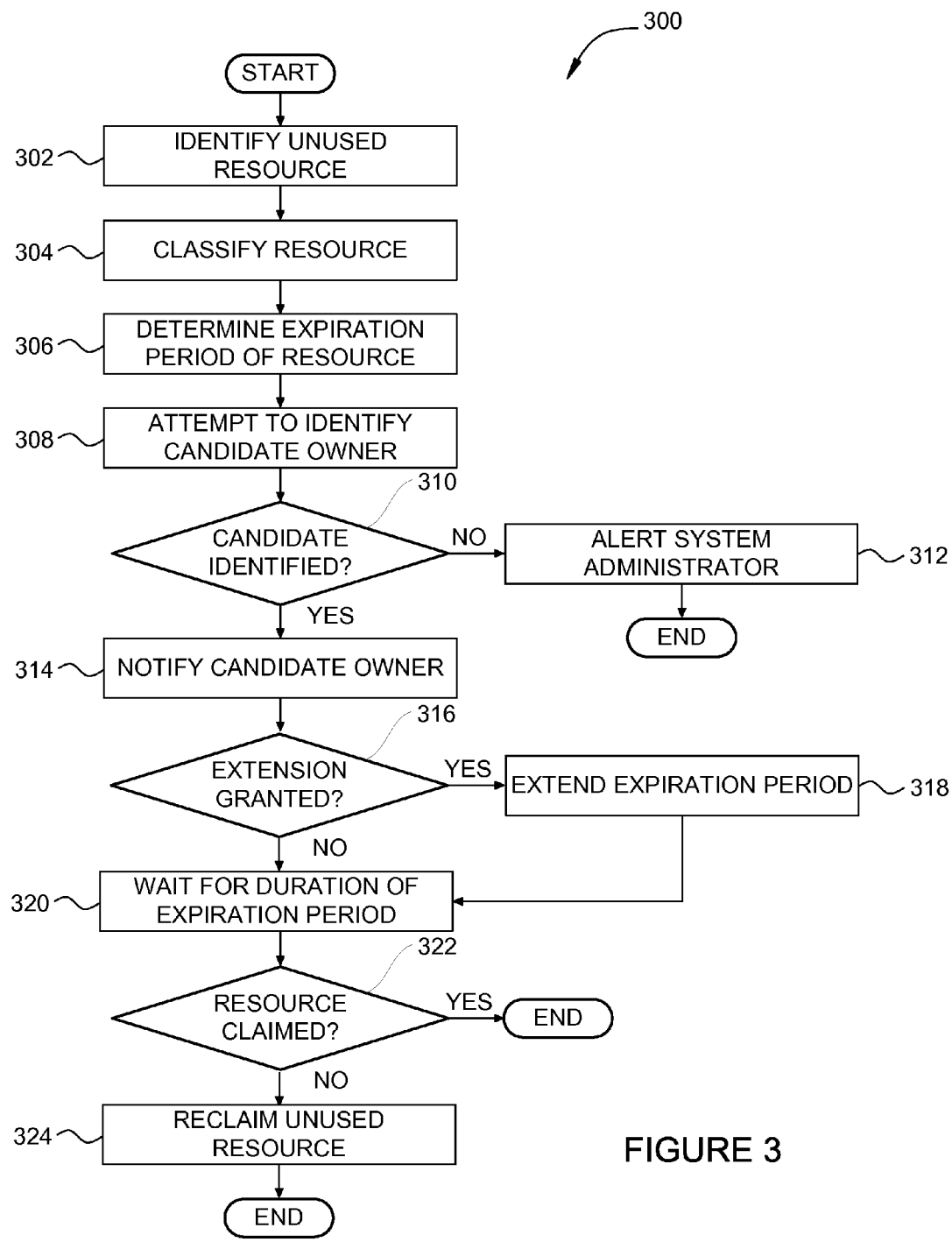
FIG. 3 sets forth a flow diagram of method steps for reclaiming unused resources within a distributed computing architecture, according to one embodiment of the present invention.

FIG. 3 sets forth a flow diagram of method steps for reclaiming unused resources within a distributed computing architecture 110, according to one embodiment of the present invention. Although the method steps are described in conjunction with the systems of FIGS. 1-2, persons skilled in the art will understand that any system configured to perform the method steps, in any order, is within the scope of the present invention.

As shown, a method 300 begins at step 302, where the reclamation component 223 identifies an unused resource. For example, the reclamation component 223 may systematically scan a set of resources and determine that a resource is considered unused if the resource has not been accessed for the previous thirty days. At step 304, the reclamation component 223 classifies the unused resource. For example, the reclamation component 223 may determine that the unused resource is an unused storage volume. At step 306, the reclamation component 223 determines the expiration period for the resource according to a pre-determined rule. For example, the reclamation component 223 may determine that a storage volume expiration period is fifteen days. At step 308, the reclamation component 223 attempts to identify the candidate owner based on one or more characteristics of the resource. For example, the reclamation component 223 may examine the resource to see whether the resource is registered to a particular user, whether there is a record of the user who last accessed the resource, the time when the resource was most recently accessed, or whether the resource is associated with a particular user's account.

At step 310, the reclamation component 223 determines whether a candidate user has been identified. If a candidate user has not been identified, then the method 300 proceeds to step 312, where the reclamation component 223 alerts the system administer. The method 300 then terminates.

If, however, in step 310, a candidate user has been identified, then the method 300 proceeds to step 314, where the monitoring application notifies the candidate owner via a generated email message, a system message, or any other technically feasible means. At step 316, the reclamation component 223 determines whether a request to extend the expiration period has been received and granted, such as by request of the candidate owner. If an extension of the expiration period has been granted, then the method 300 proceeds to step 318, where the reclamation component 223 where the reclamation component 223 extends the expiration period. The method 300 then proceeds to step 320, where the reclamation component 223 waits for the duration of the extended expiration period. At step 322, the reclamation component 223 determines whether the candidate owner has claimed the resource. If the candidate owner has claimed the resource, then the method 300 terminates.

If, however, in step 322, the candidate owner has not claimed the resource, then the method 300 proceeds to step 324, where the reclamation component 223 reclaims the resource. The method 300 then terminates.

Returning to step 316, if an extension of the expiration period has not been granted, then the method proceeds to step 320 and continues as described above.

In sum, a reclamation component 223 within a reclamation application 164 searches a distributed computing architecture 110 for unused resources such as storage volumes and out of date software applications. A resource may be considered unused if, for example, the resource has not been accessed for an extended period. The resource is classified via one or more classification criteria such as whether the resource is a storage volume. The reclamation component 223 determines an expiration period for the resource based on a set of reclamation rules 229. The reclamation component 223 identifies a candidate owner based on one or more characteristics of the resource, such as registration of the resource to or access of the resource by a particular username. The reclamation component 223 notifies the candidate owner that the unused resource is to be reclaimed at the termination of the expiration period unless the candidate owner claims the resource. If the candidate owner claims the resource, then the reclamation component 223 terminates the reclamation of the resource. Alternatively, the candidate owner may request an extension to the termination period before the resource is claimed. If the candidate owner has not claimed the resource by the end of the expiration period, then the reclamation component 223 reclaims the resource. The resource may then be relinquished or redeployed by the system administrator.

Advantageously, unused resources within a distributed computing architecture 110 are reclaimed and subsequently relinquished or redeployed. Resources may be redeployed for other purposes, thus increasing overall efficiency and utilization. Resources that are no longer needed may be relinquished resulting in lower operating and maintenance costs. Further, some unused resources may pose a security risk. Reclaiming such resources may improve security within the distributed computing architecture 110.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

What is claimed is:

1. A computer-implemented method comprising:
   determining a classification for a resource within a distributed computing architecture based on one or more classification criteria;
   generating a notification that the resource is to be reclaimed at the termination of an expiration period; and
   if the resource is claimed within the expiration period, then terminating the reclamation of the resource; or
   if the resource is not claimed within the expiration period, then reclaiming the resource.

2. The method of claim 1, further comprising determining the expiration period based on a reclamation rule that specifies a fixed expiration period for the classification.

3. The method of claim 1, further comprising identifying a candidate owner for the resource based on at least one of a username associated with one or more data files stored within the resource and a username to which the resource is registered.

4. The method of claim 1, further comprising determining that the resource is eligible for reclaiming based on a date on which the resource was last accessed.

5. The method of claim 1, wherein the resource comprises an instance of a software application, and multiple instances of the software application exist within the distributed computing architecture, and further comprising determining that the resource is eligible for reclaiming based on a software version number of the instance of the software application.

6. The method of claim 1, further comprising:
   receiving a request to extend the expiration period; and
   in response to the request, extending the expiration period.

7. The method of claim 1, wherein the resource comprises at least one of an instance of a software application, a user account, and a storage volume.

8. The method of claim 1, wherein the resource is associated with at least one of a processing capacity, a storage volume, and a relational database.

9. The method of claim 1, wherein the resource comprises a storage volume, and further comprising determining that the resource is eligible for reclaiming because the storage volume contains no data.

10. A non-transitory computer-readable storage medium including instructions that, when executed by a processor, cause the processor to perform the steps of:

determining a classification for a resource within a distributed computing architecture based on one or more classification criteria;
generating a notification that the resource is to be reclaimed at the termination of an expiration period; and
if the resource is claimed within the expiration period, then terminating the reclamation of the resource; or
if the resource is not claimed within the expiration period, then reclaiming the resource.

11. The non-transitory computer-readable storage medium of claim 10, further comprising determining the expiration period based on a reclamation rule that specifies a fixed expiration period for the classification.

12. The non-transitory computer-readable storage medium of claim 10, further comprising identifying a candidate owner for the resource based on at least one of a username associated with one or more data files stored within the resource and a username to which the resource is registered.

13. The non-transitory computer-readable storage medium of claim 10, further comprising determining that the resource is eligible for reclaiming based on a date on which the resource was last accessed.

14. The non-transitory computer-readable storage medium of claim 10, wherein the resource comprises an instance of a software application, and multiple instances of the software application exist within the distributed computing architecture, and further comprising determining that the resource is eligible for reclaiming based on a software version number of the instance of the software application.

15. The non-transitory computer-readable storage medium of claim 10, further comprising:
receiving a request to extend the expiration period; and
in response to the request, extending the expiration period.

16. The non-transitory computer-readable storage medium of claim 10, wherein the resource comprises at least one of an instance of a software application, a user account, and a storage volume.

17. The non-transitory computer-readable storage medium of claim 10, wherein the resource is associated with at least one of a processing capacity, a storage volume, and a relational database.

18. A system, comprising:
a processor; and
a memory including instructions that, when executed by the processor, cause the processor to perform an operation, by:
determining a classification for a resource within a distributed computing architecture based on one or more classification criteria;
generating a notification that the resource is to be reclaimed at the termination of an expiration period; and
if the resource is claimed within the expiration period, then terminating the reclamation of the resource; or
if the resource is not claimed within the expiration period, then reclaiming the resource.

19. The system of claim 18, further comprising:
a plurality of compute nodes, wherein each compute node included in the plurality of compute nodes comprises a node processor and a node memory; wherein:
a first node processor associated with a first compute node included in the plurality of compute nodes is configured to execute a first active application component associated with a networked application, and
a second node processor associated with a second compute node included in the plurality of compute nodes is configured to execute a second active application component associated with the networked application.

20. The system of claim 19, wherein the resource resides on at least one compute node in the plurality of compute nodes.

* * * * *